UNITED STATES PATENT OFFICE.

CARL V. PETRAEUS, OF JOPLIN, MISSOURI.

PROCESS OF TREATING SUBLIMED LEAD.

SPECIFICATION forming part of Letters Patent No. 439,733, dated November 4, 1890.

Application filed December 14, 1889. Serial No. 333,787. (No specimens.)

*To all whom it may concern:*

Be it known that I, CARL V. PETRAEUS, a citizen of the United States, residing at Joplin, county of Jasper, and State of Missouri, have invented a new and useful Improvement in the Process of Treating Sublimed Lead, of which the following is a full, clear, and exact description.

My invention relates to an improved method of treating sublimed lead to deprive it of its tendency to harden when ground in pure oil. I accomplish this as herein described.

Sublimed lead of commerce is a white pigment consisting mainly of sulphate, sulphite, and oxide of lead, and it also contains sometimes oxide of zinc, &c. It is manufactured either directly from native lead sulphide (galena ore) or indirectly from native lead-sulphide. If the pigment be made from galena directly, the galena is exposed to the joint action of heat and a current of air and the fumes given off are condensed in a dry state in bags of textile material. In the other case the ore is first smelted, so as to smelt down into the metal state a large portion of the lead, together with any precious metals, and the slag and fumes after this treatment are then converted into the pigment. The sublimed lead of commerce is thus formed from the condensation of lead fumes in bags of textile material obtained by the volatilization and combustion of lead or other lead material. This sublimed lead has a tendency to harden when ground in pure oil, and the cause of this tendency is not fully understood. I have discovered that this tendency to harden may be overcome by mixing the sublimed lead with water, then drawing off the superfluous water, and then drying the material again. It will be found that after the sublimed lead has been thus treated the tendency to harden has disappeared and it may be ground in pure linseed-oil. Instead of using pure water, I prefer to add to each one hundred pounds of sublimed lead from two per cent. to five per cent. of sodium chloride, (common salt,) the result being that there is an improvement in the color of the pigment, in addition to its being deprived of the tendency to harden. The improvement in the color results from the change in the oxide of lead to the paler oxychloride of lead.

Having now described my invention, what I claim as new, and desire to secure by Letters Patent, is—

1. The hereinbefore-described process, which consists in mixing sublimed-lead pigment with water, then drawing off the superfluous water, and then drying the material, substantially as and for the purpose described.

2. The hereinbefore-described process, which consists in mixing sublimed-lead pigment with water and sodium chloride combined, substantially as and for the purpose described.

In testimony of which invention I have hereunto set my hand.

CARL V. PETRAEUS.

Witnesses:
   A. E. SPENCER,
   GALEN SPENCER.